(12) United States Patent
Tuteja et al.

(10) Patent No.: US 12,118,389 B1
(45) Date of Patent: Oct. 15, 2024

(54) SYSTEMS AND METHODS FOR DETERMINING ALLOCATABLE RESOURCES DURING PROPORTIONAL MAINTENANCE OF COMPLEX COMPUTING SYSTEMS USING BIFURCATED FILTERING

(71) Applicant: Citibank, N.A., New York, NY (US)

(72) Inventors: Deepali Tuteja, Irving, TX (US); Girish Wali, Irving, TX (US); Prasanth Babu Madakasira Ramakrishna, Irving, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/664,183

(22) Filed: May 14, 2024

(51) Int. Cl.
*G06F 9/50* (2006.01)

(52) U.S. Cl.
CPC .............. *G06F 9/50* (2013.01); *G06F 9/5083* (2013.01); *G06F 9/5011* (2013.01); *G06F 9/5027* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 2004/0267548 A1* | 12/2004 | Jones | G06Q 30/06 705/40 |
| 2012/0317578 A1* | 12/2012 | Kansal | G06F 9/5077 718/104 |
| 2019/0095245 A1* | 3/2019 | Abes | G06F 9/505 |

\* cited by examiner

*Primary Examiner* — Qing Yuan Wu
(74) *Attorney, Agent, or Firm* — Foley & Lardner LLP

(57) ABSTRACT

Systems and methods for proportional maintenance of complex computing systems. By using proportional maintenance (e.g., recommending/allocating resources based on current usage in the computing system), the systems and methods may scale current resources (e.g., hardware and/or software components) based on how those resources are currently utilized.

20 Claims, 6 Drawing Sheets

SYSTEMS AND METHODS FOR DETERMINING ALLOCATABLE RESOURCES DURING PROPORTIONAL MAINTENANCE OF COMPLEX COMPUTING SYSTEMS USING BIFURCATED FILTERING

BACKGROUND

Modern computer networks are complex due to a variety of factors, each contributing to the intricacies of designing, implementing, and/or maintaining network infrastructures. For example, networks must support a wide range of applications, from simple file sharing to complex cloud computing services, each with its own requirements for bandwidth, latency, and reliability. Catering to these diverse needs within a single network architecture adds complexity. Moreover, networks are expected to scale seamlessly from small setups to global infrastructures, accommodating an ever-increasing number of devices and users. These ever-scaling networks are made up of diverse hardware and software components from different vendors and ensuring these components work together seamlessly requires adherence to a complex web of standards and protocols. The evolution of these standards and the introduction of new technologies adds even more layers of complexity.

SUMMARY

Given the complexity, maintaining an ever-scaling, network infrastructure of hardware and software components presents an ever-increasing technical challenge. This technical challenge is further compounded as what resource (e.g., whether a hardware or software component) is currently being used by a given application, is currently over allocated, and/or otherwise contributing to one or more application processes is difficult to determine due to the layers of complexity and distributed nature of network infrastructures. That is, a given processing instance may be attributable to numerous different resources. In contrast, a system may not be able to identify any resource attributable to a given processing instance. However, even solving this technical challenge (e.g., determining what resource to allocate a given processing instance) still does not provide proper maintenance to the network because in many instances there is no mechanism for appropriately scaling determined resources.

In view of the technical challenge of maintaining complex networks, systems and methods are described herein for proportional maintenance of complex computing systems. By using proportional maintenance (e.g., recommending/allocating resources based on current usage in the computing system), the systems and methods may scale current resources (e.g., hardware and/or software components) based on how those resources are currently utilized. That is, the system may automatically prioritize investment in resources that are determined to be used by a given user, user account, computing system, etc.

To provide proportional maintenance of complex computing systems, the systems and methods must overcome the technical challenges described above. Specifically, in order to provide for proportional maintenance, the system must first determine to which resource current usage should be attributed. That is, the system must determine for the numerous processes required by one or more applications running simultaneously across a computer network, which of those processes (and to what extent) should be attributed to a given resource (e.g., respective hardware and/or software components). The system must then determine if that resource may be scaled, and if so, by how much.

Because of this, the systems and methods use a bifurcated filtering process to filter both detected processing instances as well as resources to which the detected processing instances may be attributed to. By filtering both the processing instances and the resources in separate steps, the system overcomes the technical challenge that, in most scenarios, the majority of processing instances/resources may not be detectable/attributable. That is, the first step filters out any instances that are not detectable, while the second step filters out any detected resources that are not scalable. For example, in the first step, the systems and methods may rely on attributes of the processing instances (or lack thereof) to determine an attributable resource. In the second step, the attributable resources (or lack thereof) and/or other activity on the network to determine how a given resource (if any) may be scaled.

In some aspects, systems and methods are described for determining allocatable resources during proportional maintenance of complex computing systems using bifurcated filtering. For example, the system may receive a log of a plurality of processing instances for a first computing system. The system may determine a first subset of processing instances by filtering the plurality of processing instances based on whether each of the plurality of processing instances are attributable to one or more identifiable resources. The system may determine a second subset of processing instances by filtering the first subset based on whether the one or more identifiable resources correspond to a resource available to be added to a resource pool, wherein the resource pool comprises a plurality of resources. The system may retrieve a proportional allocation setting for the first computing system. The system may determine respective allocations for each of the plurality of resources in the resource pool based on the proportional allocation setting.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
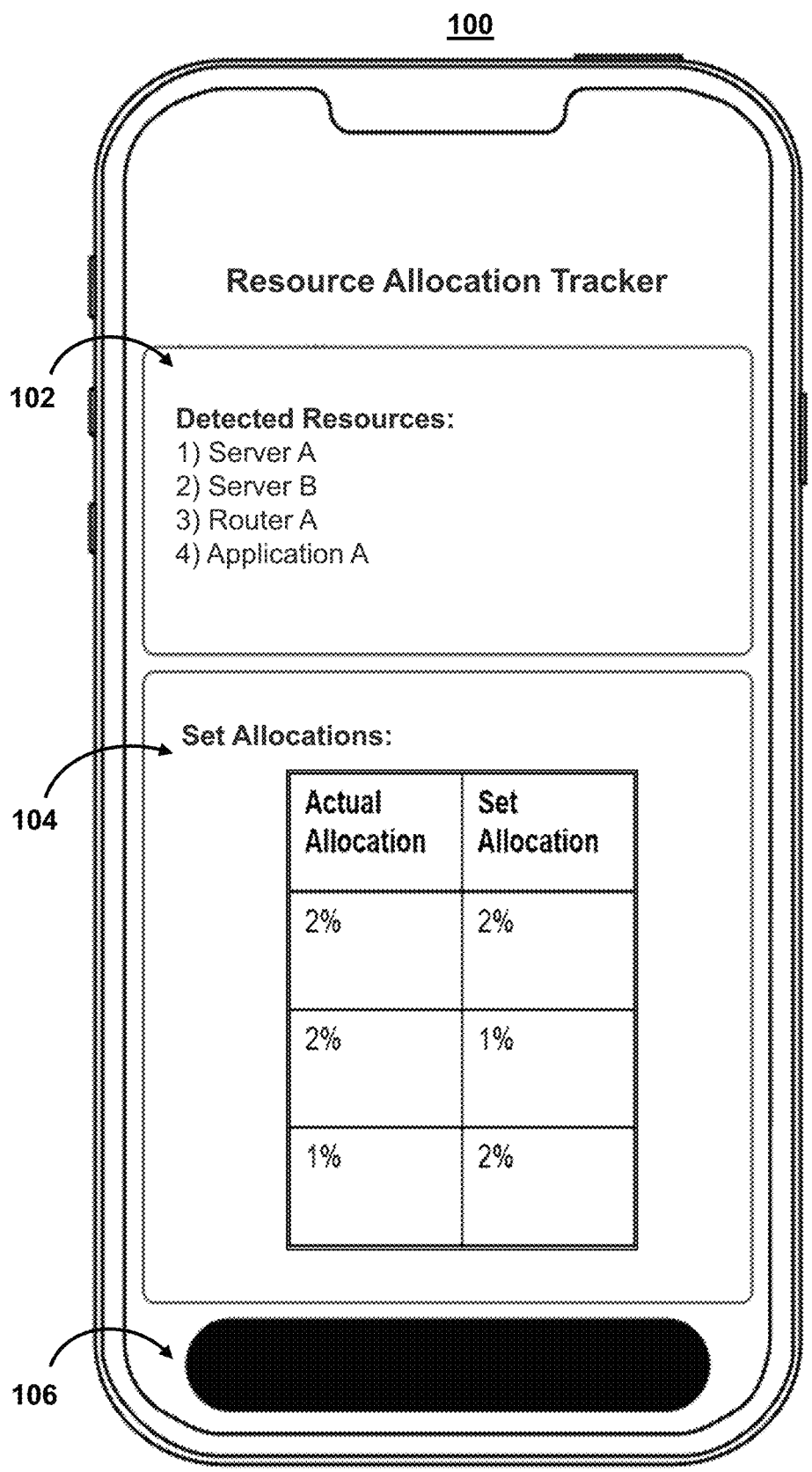
FIG. 1 shows an illustrative user interface for a resource allocation tracker, in accordance with one or more embodiments.

FIG. 1 shows an illustrative user interface for a resource allocation tracker, in accordance with one or more embodiments. For example, FIG. 1 shows user interface 100. As described herein, a user interface is the part of a software or hardware system that enables interaction between the user and the system. It consists of the elements that people interact with, such as screens, keyboards, menus, and icons, through which they communicate commands and receive feedback.

For example, user interface 100 may generating for display a recommendation corresponding to respective allocations and allow a user to execute the respective allocations based on a user input (e.g., via option 106) confirming the recommendation. For example, the user interface may include interactive elements (e.g., option 106), such as buttons or sliders, allowing users to modify or approve the recommended allocations. Users can tweak the recommendations based on additional insights or constraints that the system may not have considered. Once the user finalizes their decisions, they can execute these changes directly from the interface. To facilitate this, the system is equipped with execution mechanisms that apply the user's decisions to the resource management framework. This might involve automated scripts or manual processes initiated by system commands that adjust resource distribution in real-time. The system ensures that all user inputs are validated and confirmed before execution to prevent errors and ensure that all changes are intentional and correct.

As shown in FIG. 1, user interface 100 includes detected resources 102 and allocations 104. The system may then institute allocations 104 upon resources 102 via a user input on option 106. In some embodiments, resources 102 may comprise a hardware or software component. A hardware component refers to any physical part of a computer or electronic system that has a specific function within the device's architecture. These components include items such as the central processing unit (CPU), memory modules (RAM), hard drives, motherboards, power supplies, and peripherals like keyboards, mice, and printers. Hardware components can also extend to more specialized parts used in different types of devices, such as sensors in smartphones or actuators in robotic systems. The performance and capabilities of a computer or electronic device are largely determined by the quality and configuration of its hardware components. A software component may be a modular unit of code designed to perform a specific function within a larger software system. These components are built to be reusable and can be integrated into different software applications to provide specific functionalities without the need to rewrite code from scratch. Software components may be characterized by their well-defined interfaces, which specify the inputs, outputs, and behaviors the components handle, allowing them to communicate with other components and the broader system. This modularity supports a design approach known as component-based software engineering, which facilitates development efficiency, ease of maintenance, and scalability. Examples of software components include libraries, frameworks, and modules that developers integrate to handle tasks such as data management, user interface rendering, or network communications.

In some embodiments, resources 102 may comprise other groups or clusters. For example, resources may comprise any object or entity corresponding to a given processing instance. As described herein, a processing instance may refer to a specific occurrence of a computational task or process being executed within a computing environment. This term is commonly used in contexts where multiple similar tasks are run concurrently or in systems designed to handle such tasks in isolation from one another. For example, in cloud computing, a processing instance might represent a virtual server or machine that is running on a physical server, dedicated to executing specific applications or services. Each instance operates independently, with its own allocation of resources such as CPU time, memory, and storage, providing the necessary computing power to process data or handle user requests.

In some embodiments, a processing instance may refer to a specific execution of a process or thread that is part of the application. This instance is responsible for performing designated tasks, such as processing user inputs, executing business logic, managing data transactions, and/or interfacing with other systems. Each instance may operate within its own runtime environment, potentially isolated from other instances to ensure that the operations do not interfere with one another, thereby enhancing the stability and reliability of the application.

Characteristics of processing instances (e.g., processing characteristics) may include various computer metrics and/or characteristics describing and evaluating the performance of processing instances. For example, characteristics may include CPU usage, which measures the percentage of the processor capacity utilized by the instance; this indicates the intensity of computational tasks being performed. Characteristics may include memory usage, which tracks the amount of RAM consumed, vital for assessing whether the instance has enough memory to operate efficiently. Characteristics may include disk I/O (input/output) rates, which detail the data read from and written to storage, and network I/O, which measures data transmission over the network. Characteristics may include latency, which is measured to determine the response time of the instance to requests, critical for real-time applications where delays can degrade performance or user experience. Characteristics may include throughput, which is the number of tasks or transactions the instance can handle within a specific timeframe, indicates the processing efficiency. Characteristics may include monitoring error rates, as this helps in identifying stability issues by tracking the frequency of exceptions or transaction failures.

In some embodiments, processing characteristics may be based on hardware metrics that reflect the system's operational characteristics. For example, CPU utilization is a primary metric, indicating how much of the processor's capacity is being used, which helps in understanding processing power usage and detecting potential overloads. Memory utilization measures the amount of physical and virtual memory consumed by the instance, crucial for ensuring there is adequate memory available and for spotting memory-related bottlenecks. Disk utilization tracks usage patterns and performance of the storage subsystem, including read/write speeds and the queue length, which are essential for evaluating data handling efficiency. Network bandwidth and latency are also vital metrics; they assess the amount of network resources the hardware instance consumes and the speed at which it can communicate, which are critical in network-intensive applications. Power consumption is increasingly important, especially in data center environments, as it impacts operational costs and sustainability efforts. Temperature monitoring ensures hardware components operate within safe thermal limits, preventing overheating that could lead to hardware failure.

In some embodiments, a processing instance may correspond to a credit card, payment card, and/or other electronic transaction and/or the specific computational process dedicated to handling the tasks involved in the authorization and settlement of the credit card, payment card, and/or other electronic transaction. For example, when a credit card transaction is initiated (e.g., when a customer swipes, inserts, or taps their card at a point-of-sale terminal or enters their card details online) a processing instance is created to manage this transaction. This instance may be responsible for several critical functions (each of which may comprise an individual processing instance), including the verification of the card details, the validation of the transaction against the cardholder's available credit limit, and the secure transmission of data between merchants, payment gateways, and banking institutions. Characteristics of the processing instance May include all relevant data, such as the card number, the date, a time stamp, merchant identifiers, transaction amounts, and/or other merchant details. Once the transaction is authorized, the processing instance may correspond to a final settlement, ensuring that funds are properly transferred from the cardholder's bank to the merchant's account.

Based on the processing characteristics of a plurality of processing instances, a system may detect one or more resources (e.g., resources 102). For example, the system may determine the respective allocations for each of the plurality of resources in the resource pool by determining a respective processing characteristic, as indicated in the log, of a processing instance in the second subset and comparing the proportional allocation setting to the respective processing characteristic.

The system may also retrieve a set of allocations. The resource allocation may involve distributing available resources among various tasks, projects, and/or users to optimize efficiency and achieve specific goals related to the processing instances. The methods of allocation can vary significantly depending on the type of resource being managed. In some embodiments, the allocation may be a static allocation, where resources are assigned to specific tasks or services without change over time. This approach is straightforward but lacks flexibility in responding to changing demands. In some embodiments, the allocation may be a dynamic allocation, which allows resources to be reassigned or scaled according to real-time needs, enhancing responsiveness and efficiency, particularly in environments like cloud computing or in project management where workload can fluctuate. In some embodiments, the allocation may be a priority-based allocation that assigns resources based on the priority level of tasks or projects. Higher priority tasks receive more or better resources to ensure critical operations proceed without delay. In some embodiments, the allocation may be a round-robin or equitable distribution, where resources are allocated in a rotating fashion to ensure all processes or users get fair access over time, commonly used in processor time allocation in operating systems. In some embodiments, the allocation may be based on load balancing. Load balancing is particularly relevant in network services and cloud computing, where work is distributed across multiple servers or nodes to prevent any single resource from becoming a bottleneck. This method can optimize performance and prevent downtime. Additionally, queue-based allocation, where tasks are lined up and resources are assigned as they become available, is used in various scenarios from customer service to batch processing in data centers.

In some embodiments, the system may receive a setting or criteria for these different allocations. The setting and/or criteria for an allocation may determine the type of allocation method used as well as any weights (and/or the amount thereof) applied to one or more resources. The selection of different types of resource allocation methods (and the weights to apply to different resources during the allocation) may depend on several criteria that align with the operational goals, resource characteristics, and specific requirements of the system or project. One example may be efficiency (e.g., resources are selected based on their ability to maximize the use of resources while minimizing waste). For instance, dynamic allocation is preferred in environments where resource demands fluctuate unpredictably, such as in cloud computing, to adjust resources in real-time and maintain efficiency. Fairness may be another important criterion, especially in environments where resources must be shared equitably among multiple users or processes, such as in multi-tenant architectures or when allocating network bandwidth. Round-robin or equitable distribution methods are typically used in these scenarios to ensure all parties have fair access. Performance objectives such as speed, response time, and throughput also guide the selection of allocation methods. Priority-based allocation might be chosen to ensure that critical tasks have the resources they need to perform optimally, crucial in real-time processing or high-stakes financial transactions. Scalability is crucial in deciding on an allocation method; the chosen method must support the ability to scale resources up or down based on the growth or contraction in demand. Dynamic allocation is often essential in rapidly growing technological environments or seasonal businesses. Cost considerations also influence allocation choices. Methods that can optimize the use of expensive resources or reduce operational costs without compromising service quality are preferred. In some cases, the cost of implementing a sophisticated dynamic or priority-based system may be justified by the potential savings in resource consumption and improved service delivery. Finally, complexity and administrative overhead involved in implementing and managing specific allocation methods can determine their selection. Simpler, static methods might be used where the environment is stable and predictable, minimizing the need for constant management, while more complex dynamic systems might be necessary in environments where conditions change rapidly.

As shown in FIG. 1, allocations 104 use a proportional allocation setting. A proportional allocation setting during resource allocation may refer to a strategy where resources are divided among multiple resources, tasks and/or users based on predefined proportions that reflect their relative importance or need. This setting may be applied in environments where resources such as bandwidth, processing power, and/or memory need to be shared among several processes or clients in a way that aligns with their operational significance or workload intensity. In a proportional allocation system, each task or user is assigned a percentage or fraction of the total available resources. This allocation is calculated based on the predetermined criteria such as the expected workload, priority level, or historical usage patterns. For example, in a data center, critical applications might receive a higher proportion of CPU cycles or RAM compared to less critical ones to ensure that they perform optimally. Similarly, in network traffic management, bandwidth might be proportionally allocated to different services to maintain service quality and prevent bottlenecks. The key advantage of proportional allocation is its flexibility and fairness, as it allows resources to be dynamically adjusted to the needs of different users or applications while maintaining a balance that reflects their relative importance. It ensures that higher priority tasks have enough resources to function effectively without starving other tasks of necessary resources. This method is particularly useful in multi-tenant environments where balancing the needs of various stakeholders is crucial for operational efficiency and customer satisfaction.

The system may then use allocations 104 to determine how to scale resources 102. For example, upon receiving a user input on option 106, the system may scale resources 102 according to the determined allocations. That is, the system may use allocations 104 to determine how to invest in a current system (or scale a current system) that comprises resources 102.

For example, the system may scale a first computing system based on the respective allocations for each of the plurality of resources. In some embodiments, scalability allocation refers to a resource management strategy designed to adjust the amount of resources assigned to a system, application, and/or service based on its current needs and demand levels. This type of allocation is crucial in environments where workload can vary significantly, such as in cloud computing, web hosting, or large-scale enterprise applications. The primary goal of scalability allocation is to ensure that a system can handle increases in load without performance degradation, as well as efficiently scale down to conserve resources when the demand decreases. In some embodiments, scalability allocation may involve both vertical and horizontal scaling methods. Vertical scaling (or scaling up) increases the capacity of an existing server or instance by adding more resources like CPU, RAM, or storage. Horizontal scaling (or scaling out) involves adding more servers or instances to distribute the load more evenly and increase the system's overall capacity. Both methods aim to provide a seamless user experience as the number of users, transactions, or data volume grows. Effective scalability allocation may require sophisticated monitoring and automation tools to dynamically adjust resources based on real-time data. For instance, auto-scaling in cloud services automatically adjusts the number of active server instances according to predefined rules and current demand levels. This approach not only improves application performance but also optimizes resource usage and cost-efficiency, making it an essential component of modern IT operations and system design.

Figure 2A:
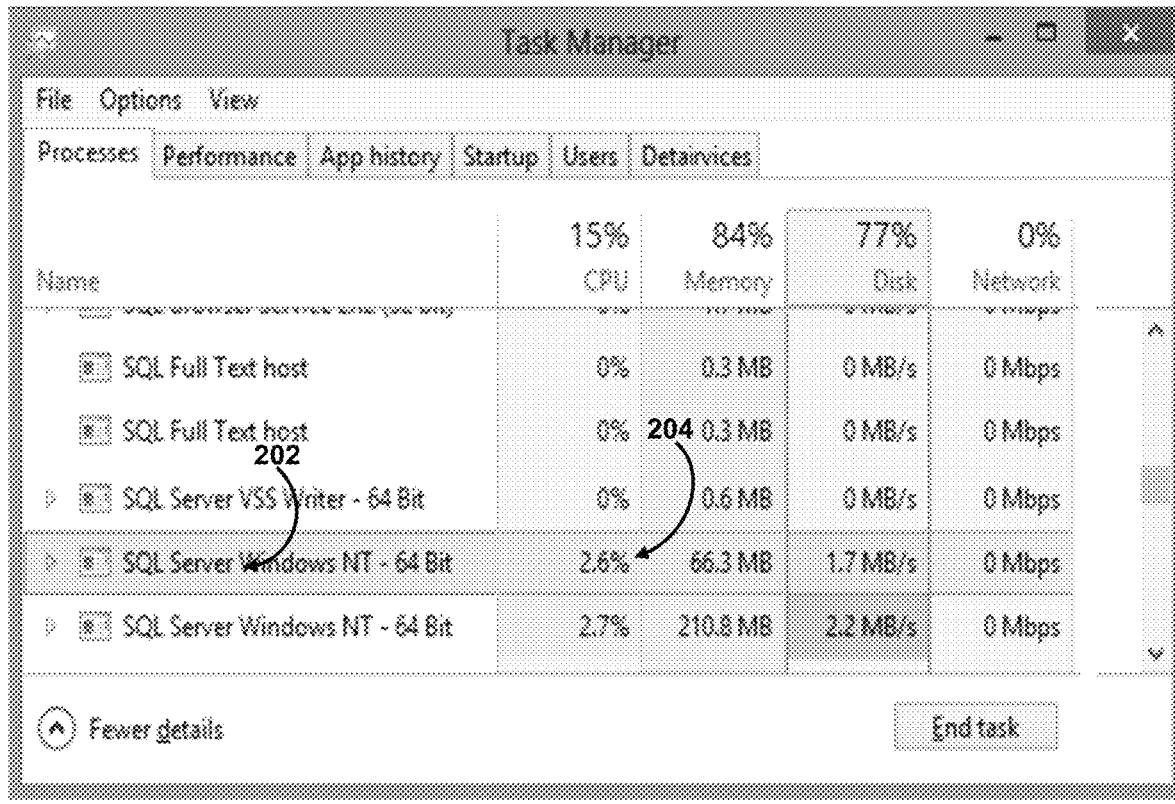
FIG. 2A shows illustrative diagrams for a plurality of processing instances, in accordance with one or more embodiments.

FIG. 2A shows illustrative diagrams for a plurality of processing instances, in accordance with one or more embodiments. For example, diagram 200 and diagram 250 may both show instances of a log of a plurality of processing instances. A log of processing instances, often referred to simply as a process log or an event log, may be a record that captures detailed information about the processes that have been executed by a computer system over a certain period. This log can include a wide range of data about each processing instance.

Diagram 200 may represent a log of computer processing instances. As shown in diagram 200, the log may also include various processing characteristics (e.g., processing characteristic 204) for each processing instance (e.g., processing instance 202) in the log. For example, the log may include a Process Identifier (PID), which is a unique number assigned to each processing instance by the operating system. The log may include timestamps such as the start and end times of the process, or the times at which significant events occurred within the process lifecycle. The log may include a process name/executable such as the name of the executable file or the process. The log may include a user or account, which is the user account under which the process was running. The log may include resource usage (e.g., information on CPU, memory, disk, and network resources used by the process). The log may include a process state that indicates whether the process is running, waiting, suspended, or terminated. If the process has completed, the log might include an exit status, indicating whether the process ended normally or with an error. The log may include a parent process ID (PPID). The PID of the parent process that started the process, if applicable.

In some embodiments, to allocate resources, the system may determine which instances in the log are attributable to a given resource. In some embodiments, the determination of which hardware or software component is used to handle a processing instance in a computer system involves several layers of abstraction and management by both the operating system (OS) and the hardware itself. The OS is responsible for process management, which includes scheduling processes and threads on the computer. It uses a scheduler to determine which process runs at any given time, based on priority, resource availability, and other scheduling algorithms (e.g., round-robin, priority scheduling). For hardware components, the OS communicates through device drivers, which are specific software interfaces designed to interact with hardware. When a process needs to access a hardware component (like reading from a disk or sending data over a network), it makes a request to the OS, which then forwards this request to the appropriate device driver. Software applications use system calls to request services from the OS. These calls are mediated by the OS to determine which resources (hardware or software) are needed to fulfill the request, whether it is memory allocation, I/O operations, or networking services.

In some embodiments, a computer may have multiple cores and can run multiple threads simultaneously. The computer, in conjunction with the OS scheduler, determines which thread or process runs on which core. Some computers also offer hardware virtualization support, further optimizing how processes are mapped to hardware. Hardware components can signal the computers via interrupts when they require attention (e.g., when new data arrives at a network card). Direct memory access allows hardware components to read/write memory without involving the CPU for data transfer, which the OS configures based on the process requirements. In some embodiments, the system may use a Hardware Abstraction Layer (HAL, which is a software layer that allows the OS to interact with hardware using a uniform interface, regardless of the specific hardware in the system. HAL helps the OS in deciding how to allocate resources efficiently among different hardware components.

As another example, diagram 250 shows a list of transactions and includes information about the transactions such as the date, location/merchant, and amount. For example, diagram 250 comprises a log that includes various processing characteristics (e.g., processing characteristic 254) for each processing instance (e.g., processing instance 252) in the log.

For example, the system may receive a log of a plurality of processing instances (e.g., instances corresponding to different transactions) for a first computing system (e.g., a merchant terminal, user account, user device, credit provider server, etc.). The system may determine a first subset of processing instances by filtering the plurality of processing instances based on whether each of the plurality of processing instances are attributable to one or more identifiable resources (e.g., filter the transactions based on whether an instance in the log can be linked to a given merchant, etc.). The system may determine a second subset of processing instances by filtering the first subset based on whether the one or more identifiable resources correspond to a resource available to be added to a resource pool (e.g., whether an identified merchant in the log has a corresponding mechanism for investing (e.g., a stock purchase option) in the merchant). For example, the resource pool (e.g., a user's investment portfolio) may comprise a plurality of resources (e.g., merchants, stocks, and/or other assets). The system may retrieve a proportional allocation setting (e.g., weighting criteria for investing) for the first computing system (e.g., a user's portfolio account). The proportional allocation to a given resource (e.g., a stock) may correspond to an amount that a user spends on products at a merchant corresponding to the stock. By doing so, the system encourages a user to invest in products/services that are used by the user. The system may determine respective allocations (e.g., an investment amount) for each of the plurality of resources in the resource pool (e.g., positions in the portfolio) based on the proportional allocation setting (e.g., weighting criteria).

Figure 2B:
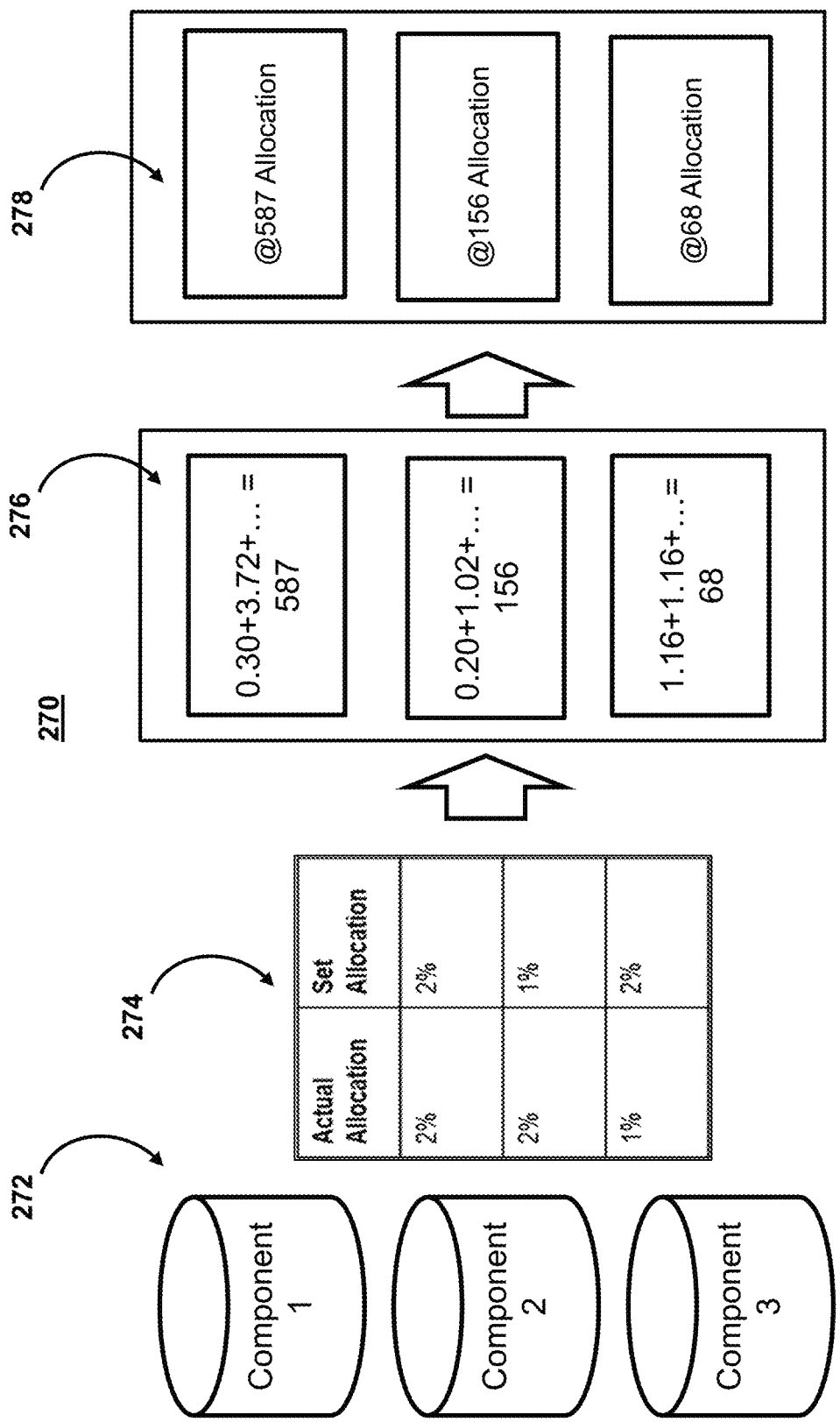
FIG. 2B shows an illustrative diagram for allocating resources based on the plurality of processing instances, in accordance with one or more embodiments.

FIG. 2B shows an illustrative diagram for allocating resources based on the plurality of processing instances, in accordance with one or more embodiments. For example, diagram 270 shows a plurality of resources (e.g., resources 272) used to facilitate one or more processing instances. The system may then apply allocation setting 274, which may comprise a proportional allocation setting.

The system may then determine one or more allocations for scaling a computing system based on applying allocation setting 274 to the one or more processing instances corresponding to resources 272. For example, the system may determine weights 276 for scaling the computing system based on applying allocation setting 274 to the one or more processing instances corresponding to resources 272. The system may then determine allocations 278 based on weights 276.

For example, the system may analyze processing characteristics of each processing instance, assigning weights based on these characteristics, and then applying allocation settings to determine the appropriate resource scaling. For example, the system may assess each instance's characteristics for CPU, memory, disk I/O, and network bandwidth utilization (e.g., in one embodiment). Based on this assessment, weights are assigned to reflect the relative importance or demand of each instance within the overall system. Once weights are assigned, proportional allocation settings are applied, where resources are scaled in the system according to the weight of each instance. If one instance has a weight (e.g., based on the characteristics of a processing instance and the allocation setting) twice that of another, it would typically receive twice the resources when scaling. Following this, the system calculates the exact amount of resources each instance should receive, scaling these resources up or down based on their weighted needs and the total resources available. After implementing these allocations, the system may continuously monitor performance and resource usage to ensure alignment with actual demands. Significant deviations or changes in processing requirements prompt adjustments in weights and re-calculations of resource allocations. This dynamic scaling, which can involve both adding more instances (horizontal scaling) and increasing resources to existing instances (vertical scaling), is crucial for maintaining optimal performance and resource efficiency.

Figure 3A:
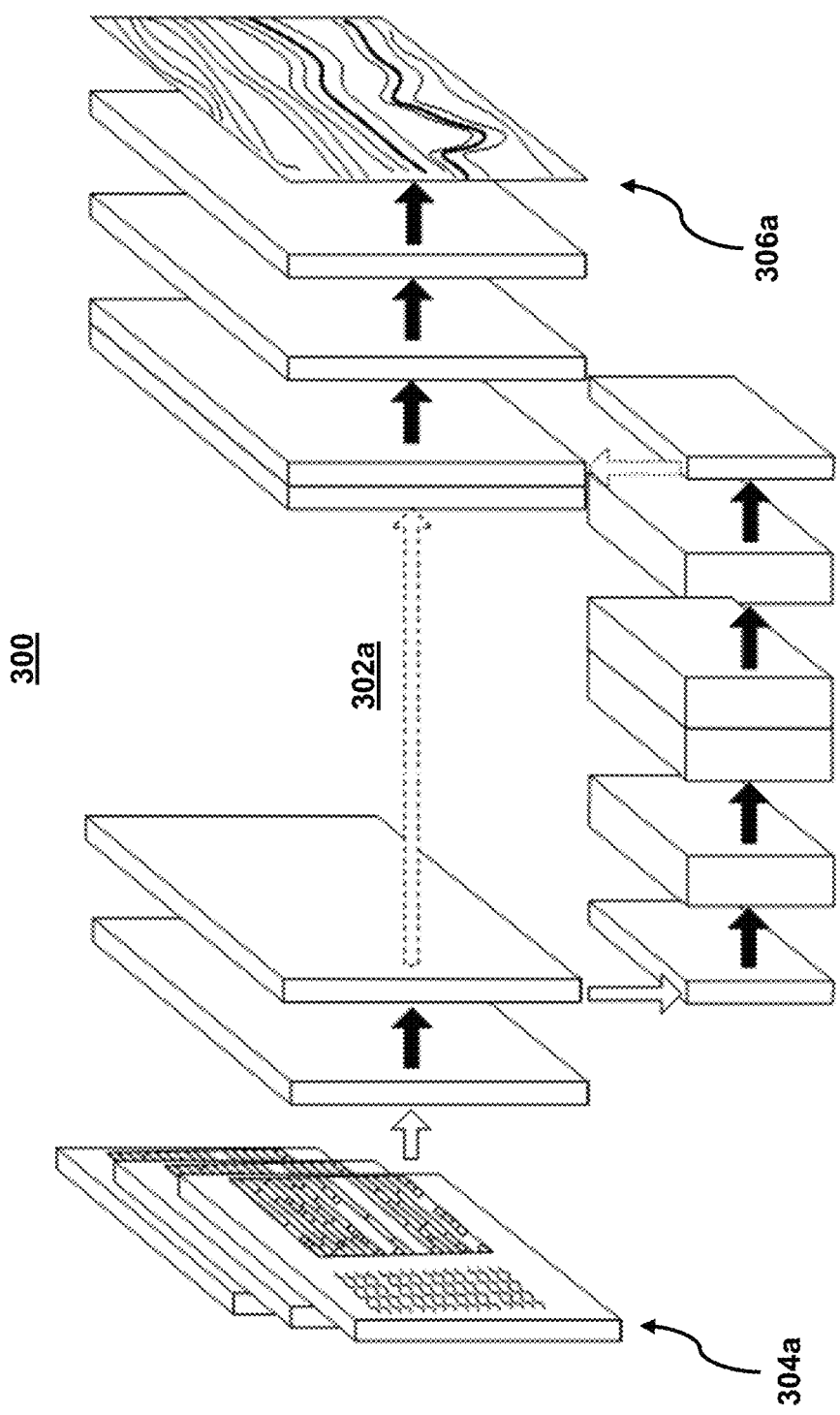
FIGS. 3A-B show illustrative components for a system used to allocate resources, in accordance with one or more embodiments.
Figure 3B:
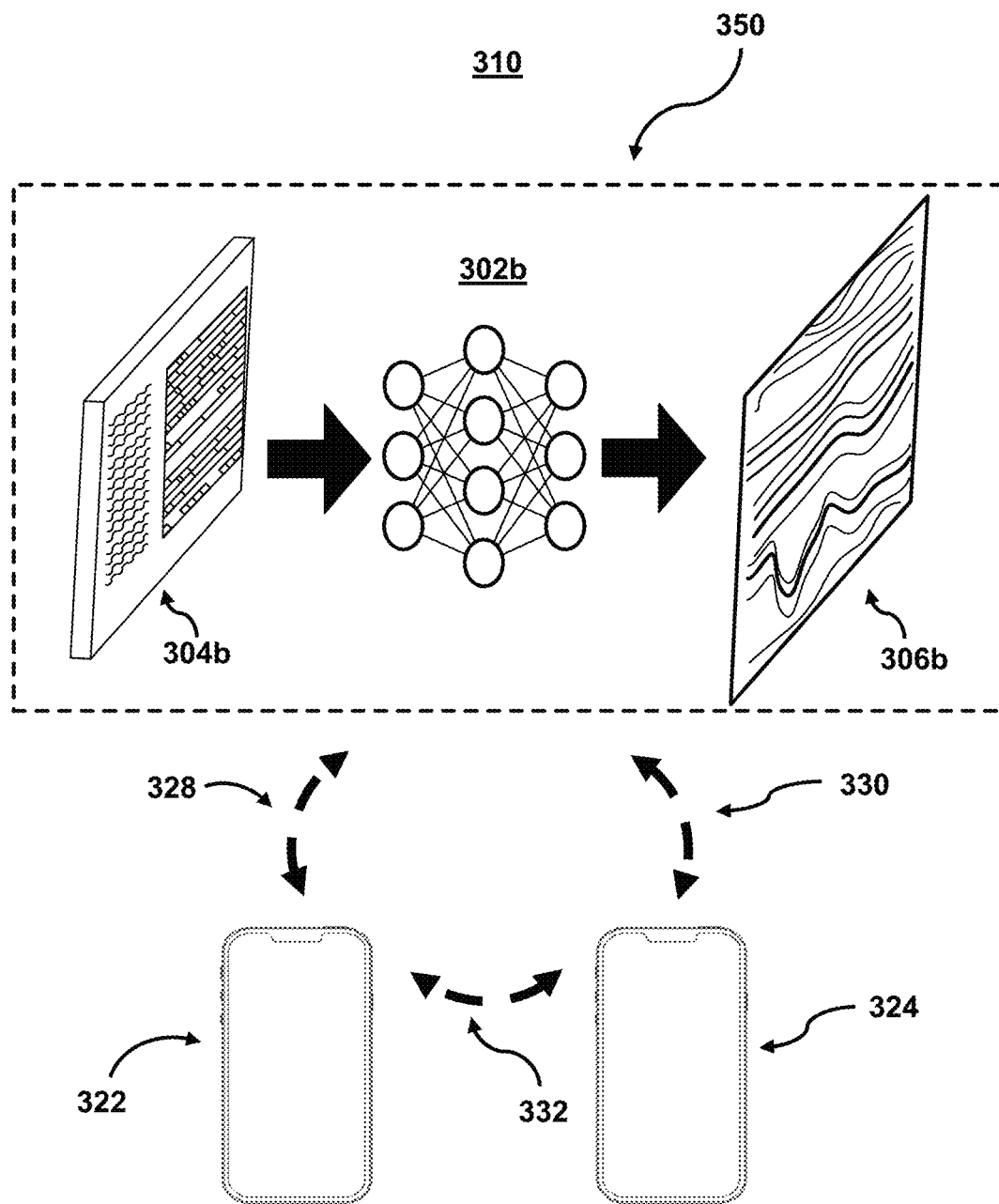

FIGS. 3A-B shows illustrative components for a system used to allocate resources, in accordance with one or more embodiments. For example, FIG. 3A may represent a model architecture used to allocate resources. For example, the system may use one or more model to determine allocatable resources during proportional maintenance of complex computing systems using bifurcated filtering.

System 300 also includes model 302a, which may be a machine learning model, artificial intelligence model, etc. (which may be referred collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 30a6, labels associated with the inputs, or with other reference feedback information). For example, the system may receive a first labeled feature input, wherein the first labeled feature input is labeled with a known prediction for the first labeled feature input. The system may then train the first model to classify the first labeled feature input with the known prediction (e.g., a resource corresponding to a processing instance, a first subset of processing instances attributable to one or more identifiable resources, a second subset of processing instances comprising one or more identifiable resources correspond to a resource available to be added to a resource pool, etc.).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306. In some embodiments, the model (e.g., model 302a) may not perform any actions. The output of the model (e.g., model 302a) may be used to determine a resource corresponding to a processing instance, a first subset of processing instances attributable to one or more identifiable resources, a second subset of processing instances comprising one or more identifiable resources correspond to a resource available to be added to a resource pool, etc.

FIG. 3B shows illustrative components for a system used to allocate resources, in accordance with one or more embodiments. For example, FIG. 3B may represent a system used to allocate resources. For example, the system may use one or more model to determine allocatable resources during proportional maintenance of complex computing systems using bifurcated filtering.

As shown in FIG. 3B, system 310 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system, and may feature one or more component devices. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

As shown in FIG. 3B, in some embodiments, model 302b may be trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving, as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, back propagation techniques may be utilized by model 302b where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., a resource corresponding to a processing instance, a first subset of processing instances attributable to one or more identifiable resources, a second subset of processing instances comprising one or more identifiable resources correspond to a resource available to be added to a resource pool, etc.).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
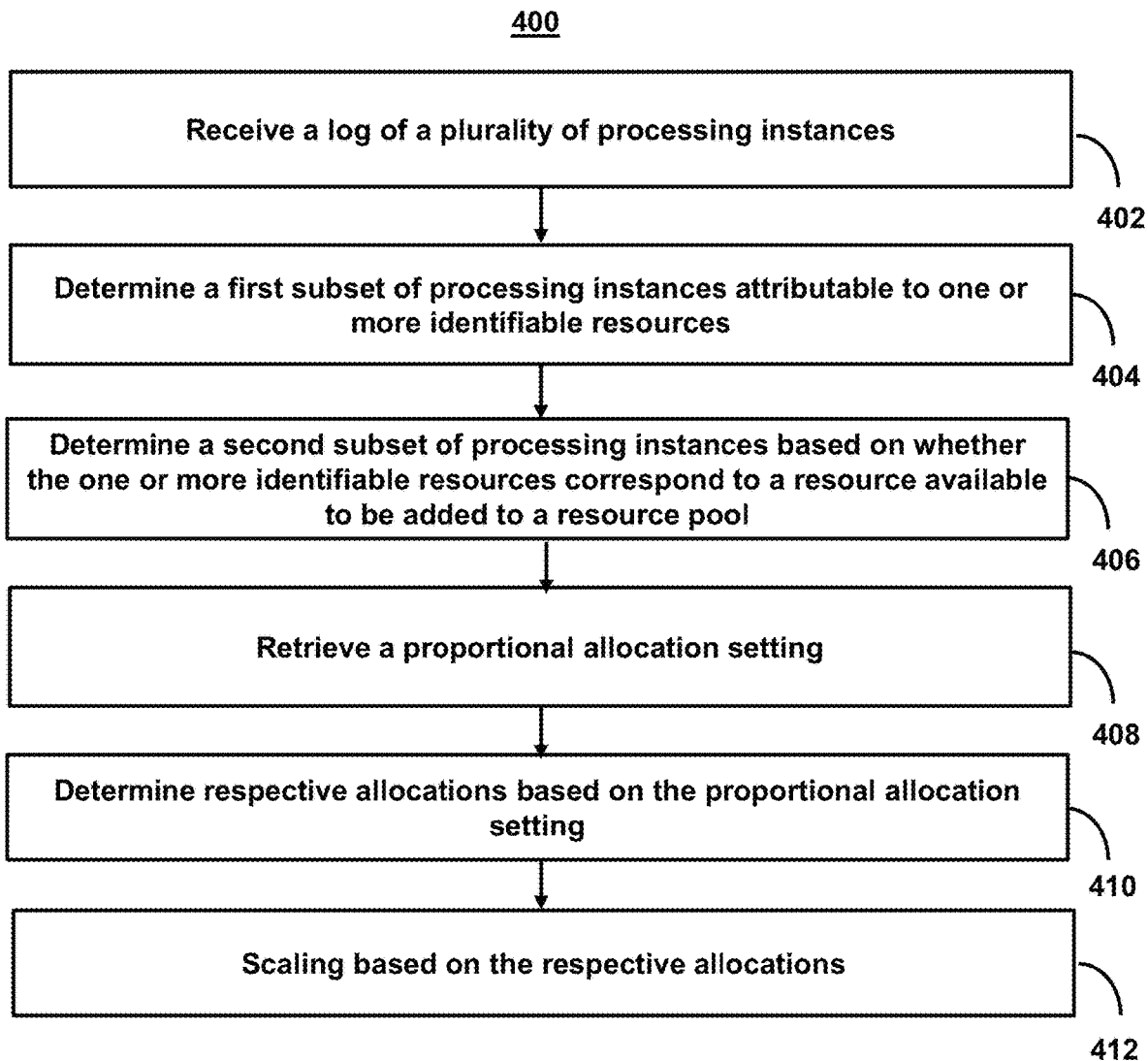
FIG. 4 shows a flowchart of the steps involved in allocating resources, in accordance with one or more embodiments.

FIG. 4 shows a flowchart of the steps involved in allocating resources, in accordance with one or more embodiments. For example, the system may use process 400 (e.g., as implemented on one or more system components described above) in order to determine allocatable resources during proportional maintenance of complex computing systems using bifurcated filtering.

At step 402, process 400 (e.g., using one or more components described above) receives a log of a plurality of processing instances. For example, the system may receive a log of a plurality of processing instances for a first computing system. For example, the system may receive a list of computer instances occurring in a computer network. Alternatively or additionally, the system may receive a list of transactions attributed to a user's account. To receive a log of a plurality of processing instances in a computer network for a first computing system, the system may perform one or more preprocessing steps. For example, each of the computing instances (e.g., transactions) within the network may need to be configured to generate logs. These logs could detail operations such as system events, error messages, and user activities. Once logging is enabled, these logs are typically collected and transmitted in real-time or at scheduled intervals to a centralized logging server or system. This central system can be part of the first computing system and/or an external service designed to handle log data. The transmission of log data often uses network protocols such as syslog in Unix/Linux systems, Windows Event Forwarding in Windows, or more modern, secure transport mechanisms like HTTPS if the logs are sent over the internet to cloud-based services. At the central logging server, the incoming log data may undergo processes like parsing, normalization, and categorization to structure the data for easier analysis and storage. This structured log data is then stored in a database or a file system within the first computing system. This storage allows for further analysis, monitoring, and retrieval of log data to support system management, security audits, performance analysis, and troubleshooting.

In some embodiments, receiving the log of the plurality of processing instances for the first computing system comprises the system determining a frequency for determining the respective allocations for each of the plurality of resources in the resource pool and generating a request for the log based on the frequency. For example, to receive the log of a plurality of processing instances for a first computing system, while also managing the allocation of resources in a resource pool, the system may incorporate a method that determines the frequency of these allocations and generates log requests accordingly. This process begins with the system setting a predetermined frequency for determining and adjusting the respective allocations for each resource within the resource pool. This frequency can be based on various operational factors such as expected changes in demand, resource usage patterns, or strategic business cycles. Once the frequency is established, the system integrates this scheduling into its monitoring and logging operations. At each interval set by this frequency, the system automatically triggers a request to gather logs from different components of the first computing system. These logs contain detailed records of all processing instances and resource usage during the period. The system's request for logs is designed to coincide with the evaluation periods for resource allocation. By synchronizing these activities, the system ensures that it has the most current data on resource utilization and processing instances at the time of each allocation review. This allows for more accurate and timely adjustments to resource allocations based on actual usage statistics and operational needs.

At step 404, process 400 (e.g., using one or more components described above) determines a first subset of processing instances attributable to one or more identifiable resources. For example, the system may determine a first subset of processing instances by filtering the plurality of processing instances based on whether each of the plurality of processing instances are attributable to one or more identifiable resources. For example, the system may determine which processing instances (or transactions) are attributable to an identifiable resource. In some embodiments, the identifiable resource may be a hardware or software component of the first computing system that is determined to correspond to a given processing instance. Additionally or alternatively, the identifiable resource may correspond to a company, merchant, and/or service determined to correspond to a given transaction. By doing so, the system may filter the plurality of instances in the log for instances in which an identifiable resource may be determined. For example, in some cases, the system may not be able to identify a resource that corresponds to a specific processing instance.

For example, to determine a first subset of processing instances by filtering from a broader set based on their attribution to one or more identifiable resources, the system may follow a structured approach, typically involving data tagging, filtering criteria, and analysis tools. Initially, each processing instance in the network may be tagged with metadata that identifies the resources involved in that instance. These resources could be specific users, devices, applications, or network segments.

The tagging can be implemented at various points in the data generation process. For example, application servers might automatically log user and session IDs with each transaction, or network monitoring tools might tag data packets with device or IP address information. The key is that this metadata accurately reflects the source and context of each processing instance, enabling precise attribution. Once the data is tagged, the system uses filtering algorithms or queries that are set up to extract subsets of data based on specific criteria-here, the association with identifiable resources. This might involve database queries, log analysis tools, or specialized software that can sift through large volumes of data to find matches based on the defined criteria. For instance, a query might look for all log entries with a specific user ID or all network traffic originating from a particular IP address. This process can be automated within a data analysis or log management system, where filters can be dynamically adjusted based on user input or predefined rules. The result is a subset of processing instances that have been clearly attributed to specific, identifiable resources. This subset can then be used for further analysis, such as performance monitoring, security analysis, or compliance auditing, providing insights that are targeted and relevant to specific aspects of the network's operation.

In some embodiments, the system may determine the first subset of processing instances by filtering the plurality of processing instances by retrieving a processing characteristic from the log and parsing the processing characteristic to identify a resource name. For example, to determine a first subset of processing instances from a larger set, the system may start by accessing the log files, which contain detailed records of all processing instances within the system. These logs hold key data such as timestamps, user IDs, resource usage information, error messages, and other relevant metadata that characterize each instance of processing. The system then focuses on retrieving specific processing characteristics from these logs, such as resource names. Resource names could refer to hardware components like CPUs or memory, software applications, or even user-defined entities that are crucial for processing tasks. The system parses this data from the log entries. Parsing involves analyzing the log's text or structured data to extract meaningful information, in this case, the resource names associated with each processing instance. Once the resource names are identified, the system applies a filter to isolate only those processing instances that involve a particular resource or set of resources. This filtering is based on matching the parsed resource names against a predefined list of resources of interest or based on user inputs specifying which resources to focus on. The result of this filtering process is a subset of processing instances that are specifically attributable to the identified resources.

In some embodiments, the system determines the first subset of processing instances by filtering the plurality of processing instances by retrieving a device driver log and comparing the device driver log to the log to identify a resource. For example, to determine a first subset of processing instances by filtering from a broader set of instances, the system may utilize logs from device drivers in conjunction with general system logs. In such cases, the system may retrieve logs specifically from device drivers, which typically record data related to the operation of hardware components and their interactions with the operating system. These logs contain critical information about device status, errors, transactions, and other events that are essential for understanding how hardware resources are used and perform during processing tasks. Simultaneously, the system accesses the general system logs, which document a wider range of processing instances across the system, including those that might not directly involve hardware interactions recorded by the device drivers. The key to filtering the relevant subset of processing instances involves comparing these two types of logs. During the comparison, the system looks for correlations or direct links between entries in the device driver log and those in the general system log. For instance, if a device driver log indicates an issue or significant activity at a specific timestamp, the system cross-references this with the general log to identify any processing instances that occurred simultaneously or were potentially impacted by the hardware event. The system uses algorithms or matching criteria, such as timestamps, error codes, device identifiers, or user IDs, to find these correlations. Once a link is established, the system can confidently attribute certain processing instances in the general log to specific events or statuses reported in the device driver log.

In some embodiments, the system may determine the first subset of processing instances by filtering the plurality of processing instances by retrieving a system call log and comparing the system call log to the log to identify a resource. For example, to determine a first subset of processing instances from a broader set, a system may perform a comparison of system call logs against general system logs. System call logs are detailed records that track the interactions between software applications and the operating system's kernel, providing insight into operations such as file access, memory management, and process control. These logs are pivotal for understanding how software resources interact with the system at a low level. The process begins with the system retrieving these system call logs, which capture specific calls made by applications to the operating system. These calls are crucial for pinpointing which resources are being accessed and manipulated, as they often include details such as which files were opened, what data was read or written, and how processes were managed. Simultaneously, the system also accesses more comprehensive system logs that record a wider array of processing instances, including those not directly linked to system calls. The next step involves a meticulous comparison between entries in the system call log and the general system log.

This comparison aims to identify overlaps or direct correlations based on criteria such as timestamps, process IDs, and user IDs. For instance, a system call to read a specific file might be correlated with a logged event in the general log that notes a spike in resource usage at the same timestamp. By comparing these two types of logs, the system can accurately identify which processing instances documented in the general system log are associated with specific system calls noted in the system call log. This linkage allows the system to filter and isolate a subset of processing instances that are directly connected to particular system calls, thus identifying the specific resources being utilized during these instances.

In some embodiments, determining the first subset of processing instances by filtering the plurality of processing instances by retrieving a system interrupt log and comparing the system interrupt log to the log to identify a resource. For example, the system may determine a first subset of processing instances by filtering from a broader set of instances based on a comparison of system interrupt logs with general system logs. System interrupt logs are crucial as they document the occurrences of interrupts, which are signals to the processor indicating events that need immediate attention, such as hardware malfunctions, input/output requests, or other critical events. The process starts with the system retrieving the system interrupt logs. These logs detail each interrupt, providing information such as the type of interrupt, the time it occurred, and which device or component triggered it. This data is essential for diagnosing issues related to hardware or critical system functions that may affect the overall performance of the system. Alongside this, the system also accesses the general system logs, which encompass a broader range of processing activities across the system. These might include system errors, application behaviors, and user activities, which are not specifically related to interrupts but provide a comprehensive view of system operations. The next step involves comparing entries from the system interrupt log with those in the general system log. The system looks for correlations or direct links based on parameters like timestamps, error codes, and device identifiers. For example, if an interrupt log entry notes a hardware failure at a specific time, the system compares this timestamp with the general log to identify any processing instances that coincided with or were potentially affected by the interrupt. By establishing these links, the system effectively filters and isolates a subset of processing instances that are directly associated with specific interrupts documented in the interrupt log. This targeted subset allows system administrators to focus on diagnosing and resolving issues related to these specific interrupts, ensuring they can address and mitigate impacts on system stability and performance more effectively.

At step 406, process 400 (e.g., using one or more components described above) determines a second subset of processing instances based on whether the one or more identifiable resources correspond to a resource available to be added to a resource pool. For example, the system may determine a second subset of processing instances by filtering the first subset based on whether the one or more identifiable resources correspond to a resource available to be added to a resource pool, wherein the resource pool comprises a plurality of resources. For example, the system may determine which identifiable resources are attributable to a resource available to be added to a resource pool. In some embodiments, the resource available to be added to the resource pool may correspond to a hardware or software component of the first computing system that may be scaled. Additionally or alternatively, the resource available to be added to the resource pool may correspond to a company, merchant, and/or service determined to correspond to an investment (e.g., available on a stock exchange). By doing so, the system may filter the plurality of instances in the log for instances in which a resource available to be added to a resource pool may be determined. For example, not all identifiable resources may be added to a resource pool. In some instances, an identifiable resource may be a specialized component that cannot be scaled or a company that a user may not invest in.

In some embodiments, the system may determine the processing instances in the first subset attributable to a single identifiable resource and further filter the first subset based on the processing instances in the first subset being attributable to the single identifiable resource. For example, to determine and further filter processing instances in a first subset that are attributable to a single identifiable resource, the system implements a structured method for data identification and filtration. This process begins with the detailed tagging or labeling of each processing instance with metadata that identifies its associated resources. These resources could include specific users, devices, applications, or any identifiable entities involved in the processing instance. First, the system scans the complete log or dataset containing all processing instances. Using the metadata tags, it isolates instances that are associated with a specific, pre-identified resource. This step is crucial as it ensures that only those instances directly related to the target resource are included in the first subset. The criteria for inclusion might be based on resource identifiers such as user IDs, device IDs, application names, or similar unique identifiers that link a processing instance to a resource. After the initial subset of processing instances attributable to the single resource is established, the system then applies further filters to refine this subset. This secondary filtration might be based on additional criteria, such as the type of processing activity, the time period of the instances, or specific attributes of the instances like error codes, performance metrics, or operational outcomes. This helps in narrowing down the subset to those instances that are not only attributable to the single resource but also meet specific operational, security, or compliance requirements. Through this two-tiered process, the system effectively isolates a refined subset of processing instances that are both attributable to a single identifiable resource and relevant to particular operational or analytical goals. This approach allows for more targeted analysis, troubleshooting, and reporting on the activities and impacts of specific resources within a larger system, enhancing resource management and oversight capabilities.

For example, to determine a second subset of processing instances by filtering a previously defined first subset, the system may employ a methodical approach that focuses on the validation and eligibility of the involved resources. Initially, the system identifies and classifies the resources involved in the processing instances of the first subset, such as system components or merchant identifiers. This step involves extracting relevant attributes from logs or transaction records. Following identification, the system checks if these resources are available for inclusion in a resource pool. This availability is contingent on various factors, including operational status and compliance with specific standards, such as whether a merchant is listed on a stock exchange or a system component is not at full capacity or undergoing maintenance. Subsequently, the system cross-references these resources against a database or list that details resources eligible for the pool. This might involve executing database queries to filter out ineligible resources, such as merchants not listed on any stock exchange or outdated system components. After determining which resources from the first subset meet these criteria, the system filters these instances to create a second, more refined subset. This subset exclusively contains processing instances involving resources that are verified as available and suitable for addition to the resource pool. This structured process ensures that only relevant processing instances are selected, facilitating targeted management tasks like resource allocation, scaling operations, or investment decisions. This approach enhances the strategic management and optimization of resources within the system.

At step 408, process 400 (e.g., using one or more components described above) retrieves a proportional allocation setting. For example, the system may retrieve a proportional allocation setting for the first computing system. For example, the system may receive an allocation setting that indicates how allocations (if any) of new resources should be made in the resource pool. The resource pool may indicate a budget available to invest in new resources or may correspond to a portfolio of the user's investments.

In some embodiments, to retrieve a proportional allocation setting for a first computing system, which indicates how new resources should be allocated within the resource pool, the system may follow a well-defined process involving configuration management and data retrieval protocols. Initially, the proportional allocation settings are defined and stored in a configuration database or a similar management tool that holds settings for various system operations. These settings dictate the rules or algorithms for distributing resources, such as CPU time, memory, or network bandwidth, among various components or users in a system based on predefined criteria.

The system accesses these settings via software interfaces or management APIs designed to interact with the configuration database. When a request for resource allocation is made, the system queries this database to fetch the relevant proportional allocation settings. This might involve specifying the type of resource and the corresponding allocation policy which could be based on factors like priority, load, or other operational parameters. The fetched allocation settings are then applied by the resource management component of the system, which handles the dynamic distribution of resources in the pool according to the retrieved settings. This ensures that each component or service within the first computing system receives an appropriate share of resources, reflecting the operational priorities and ensuring optimal performance and stability of the system. This process not only aids in maintaining efficiency and fairness in resource distribution but also adapts dynamically to changes in system load or resource availability, thereby enhancing overall system responsiveness and performance.

At step 410, process 400 (e.g., using one or more components described above) determines respective allocations based on the proportional allocation setting. For example, the system may determine respective allocations for each of the plurality of resources in the resource pool based on the proportional allocation setting. For example, the system may determine the respective allocations (e.g., as a percentage of a budgeted amount, as an absolute value, etc.) for each of the plurality of resources in the resource pool.

In some embodiments, the system may determine the respective allocations for each of the plurality of resources in the resource pool based on the proportional allocation setting by determining, based on the log, respective processing characteristics for each of the plurality of processing instances and further determining the respective allocations for each of the plurality of resources in the resource pool based on a respective processing characteristic, as indicated in the log, of a processing instance in the second subset. For example, the system may determine respective allocations not only based on the processing instances in the log (or the second subset), but also the processing characteristics for those processing instances.

In some embodiments, the system may determine the second subset of processing instances by filtering the first subset by determining respective processing characteristics, as indicated in the log, of processing instances in the first subset and further filtering the first subset based on the respective processing characteristics. For example, the system may determine the second subset not only based on the processing instances in the log (or the first subset), but also the processing characteristics for those processing instances.

For example, to determine respective allocations for each resource in a resource pool based on proportional allocation settings, the system may systematically compute and apply these settings across available resources. The process begins by interpreting the proportional allocation settings that specify how resources, whether computational power, memory, bandwidth, and/or financial budgets, should be distributed. These settings might define allocations as percentages of the total available resources or as absolute values. Once the settings are understood, the system assesses the total resources within the pool, such as total computational time and/or total budget. Using this total, the system calculates specific allocations for each resource. For example, if the allocation setting for a department is 20% and the total available computational time is 1000 hours, then the department would receive 200 hours. Similarly, if the total monetary budget is $100,000 and a department, merchant, stock, etc. is allocated 15%, it would receive $15,000 of the total budget. The system may also apply minimum and maximum limits to ensure no resource receives less or more than practical or dictated by policy, ensuring fair distribution and preventing resource starvation among projects. Additionally, in dynamic settings where resource needs fluctuate, the system may adjust allocations in real-time based on actual usage, redistributing unused resources to meet higher demands elsewhere. Finally, the system logs all allocation decisions and generates reports for administrative and auditing purposes, ensuring transparency and aiding in future resource planning. This methodical approach not only ensures that resources are allocated efficiently according to both predefined settings and operational needs but also maintains compliance with organizational policies.

In some embodiments, the system may determine the respective allocations for each of the plurality of resources in the resource pool by determining a resource pool attribute for the resource pool and comparing the proportional allocation setting to the resource pool attribute. For example, to determine respective allocations for each of a plurality of resources in a resource pool, the system may identify key attributes of the resource pool, such as total capacity, current utilization, availability, and/or performance metrics (e.g., for hardware and/or software allocation). The system may also identify key features such as risk, diversity, leverage, rate of return, etc. (e.g., for investment allocations). These attributes provide a comprehensive overview of the state of the resource pool, essential for making informed allocation decisions. Once the relevant resource pool attribute is determined, the system then compares this attribute to the proportional allocation settings that have been established.

These settings outline how resources should be distributed among various users, projects, or departments, typically specified as percentages or ratios. For example, if the proportional allocation setting specifies that a stock should receive a 20% investment of the total allocation, the system calculates what 20% represents in terms of the current stock value. The comparison involves calculating the actual amount of each resource that corresponds to the proportional settings based on the current attributes of the resource pool. If the total capacity of a resource has increased or decreased, the system adjusts the allocations accordingly to maintain the proportions specified in the settings. This ensures that each entity receives a fair share of the resources, aligned with the initial strategic planning. The system continually monitors changes in the resource pool attributes to dynamically adjust the allocations. This responsiveness not only helps in optimizing resource usage based on current needs and availability but also ensures that the system can adapt to fluctuating demands and maintain operational efficiency.

At step 412, process 400 (e.g., using one or more components described above) scales based on the respective allocations. For example, the system may scale the first computing system based on the respective allocations for each of the plurality of resources.

For example, when a system scales resources based on respective allocations for each resource within a resource pool, the system may follow a structured approach that aligns resource expansion or contraction with predefined allocation parameters. This process starts by accurately assessing the current allocation for each type of resource— be it hardware, software, processing power, financial budgets, or even retirement savings plans. The system first evaluates the current utilization and demand for each resource. This evaluation is crucial to understand which resources are nearing their capacity limits and which have surplus availability. Based on this assessment, the system references the respective allocations, which dictate the proportion of total resources that each department, project, or service should receive. These allocations are often expressed as a percentage of total resources or as fixed units. For instance, if a new hardware investment is planned, the system calculates how much of this new hardware each department should receive based on their allocated percentages. If a department is allocated 20% of the total processing power and the total processing power is to be increased by 100 units, then that department would receive an additional 20 units. The scaling process may involve more than just numerical allocation; it also considers strategic business goals, operational efficiency, and cost-effectiveness. The system might use automated tools and algorithms to ensure that the scaling actions are optimally aligned with these factors. For financial resources like investment budgets or retirement savings, the system adjusts the contributions or distributions based on the predefined allocations and current financial performance.

Dynamic adjustments may be part of this process. As resource needs evolve, the system continuously monitors usage patterns and reallocates resources accordingly, ensuring that no department or project is resource-starved or excessively resourced. This dynamic scaling helps maintain system balance and efficiency, adapting to changes in workload, priorities, and external economic factors. Finally, all scaling decisions and their rationales are documented and reported. This transparency helps in auditing resource management practices and provides a clear trail for future reference and accountability. This methodical approach to scaling ensures that resources are allocated and adjusted in a way that supports the organization's overall operational and financial health.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for determining allocatable resources during proportional maintenance of complex computing systems using bifurcated filtering.
2. The method of the preceding embodiment, further comprising: receiving a log of a plurality of processing instances for a first computing system; determining a first subset of processing instances by filtering the plurality of processing instances based on whether each of the plurality of processing instances are attributable to one or more identifiable resources; determining a second subset of processing instances by filtering the first subset based on whether the one or more identifiable resources correspond to a resource available to be added to a resource pool, wherein the resource pool comprises a plurality of resources; retrieving a proportional allocation setting for the first computing system; and determining respective allocations for each of the plurality of resources in the resource pool based on the proportional allocation setting.
3. The method of any one of the preceding embodiments, wherein determining the respective allocations for each of the plurality of resources in the resource pool based on the proportional allocation setting further comprises: determining, based on the log, respective processing characteristics for each of the plurality of processing instances; and further determining the respective allocations for each of the plurality of resources in the resource pool based on a respective processing characteristic, as indicated in the log, of a processing instance in the second subset.
4. The method of any one of the preceding embodiments, wherein determining the second subset of processing instances by filtering the first subset further comprises: determining respective processing characteristics, as indicated in the log, of processing instances in the first subset; and further filtering the first subset based on the respective processing characteristics.

5. The method of any one of the preceding embodiments, wherein determining the second subset of processing instances by filtering the first subset further comprises: determining the processing instances in the first subset attributable to a single identifiable resource; and further filtering the first subset based on the processing instances in the first subset being attributable to the single identifiable resource.

6. The method of any one of the preceding embodiments, wherein receiving the log of the plurality of processing instances for the first computing system further comprises: determining a frequency for determining the respective allocations for each of the plurality of resources in the resource pool; and generating a request for the log based on the frequency.

7. The method of any one of the preceding embodiments, wherein determining the respective allocations for each of the plurality of resources in the resource pool further comprises: generating for display, in a user interface, a recommendation corresponding to the respective allocations; and executing the respective allocations based on a user input confirming the recommendation.

8. The method of any one of the preceding embodiments, wherein determining the respective allocations for each of the plurality of resources in the resource pool further comprises: determining a resource pool attribute for the resource pool; and comparing the proportional allocation setting to the resource pool attribute.

9. The method of any one of the preceding embodiments, wherein determining the respective allocations for each of the plurality of resources in the resource pool further comprises: determining a respective processing characteristic, as indicated in the log, of a processing instance in the second subset; and comparing the proportional allocation setting to the respective processing characteristic.

10. The method of any one of the preceding embodiments, further comprising: determining a resource pool attribute based on the respective allocations; and comparing the resource pool attribute to a resource pool requirement to determine whether to execute the respective allocations.

11. The method of any one of the preceding embodiments, further comprising: determining current resource pool allocations; determining a resource pool attribute based on the respective allocations and the current resource pool allocations; and comparing the resource pool attribute to a resource pool requirement to determine whether to execute the respective allocations.

12. The method of any one of the preceding embodiments, wherein determining the first subset of processing instances by filtering the plurality of processing instances further comprises: retrieving a processing characteristic from the log; and parsing the processing characteristic to identify a resource name.

13. The method of any one of the preceding embodiments, wherein determining the first subset of processing instances by filtering the plurality of processing instances further comprises: retrieving a device driver log; and comparing the device driver log to the log to identify a resource.

14. The method of any one of the preceding embodiments, wherein determining the first subset of processing instances by filtering the plurality of processing instances further comprises: retrieving a system call log; and comparing the system call log to the log to identify a resource.

15. The method of any one of the preceding embodiments, wherein determining the first subset of processing instances by filtering the plurality of processing instances further comprises: retrieving a system interrupt log; and comparing the system interrupt log to the log to identify a resource.

16. A tangible, non-transitory, computer-readable medium storing instructions that, when executed by a data processing apparatus, cause the data processing apparatus to perform operations comprising those of any of embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

What is claimed is:

1. A system for determining allocatable resources during proportional maintenance of complex computing systems using bifurcated filtering, the system comprising:
one or more processors; and
one or more non-transitory, computer-readable media, comprising instructions that, when executed by the one or more processors, cause operations comprising:
receiving a log of a plurality of processing instances for a first computing system, wherein the plurality of processing instances each correspond to an instance of a computer program that is being executed, and wherein the log indicates respective processing characteristics for each of the plurality of processing instances;
determining a first subset of processing instances by filtering the plurality of processing instances based on whether each of the plurality of processing instances are linked to one or more identifiable resources, wherein the one or more identifiable resources correspond to a component of the first computing system;
determining a second subset of processing instances by filtering the first subset based on whether the one or more identifiable resources correspond to a resource available to be added to a resource pool, wherein the resource pool comprises a plurality of resources available to receive a resource allocation;
retrieving a proportional allocation setting for the first computing system, wherein the proportional allocation setting comprises a criterion for determining a respective allocation for the plurality of resources based on the respective processing characteristics;
determining respective allocations for each of the plurality of resources in the resource pool based on the proportional allocation setting and a respective processing characteristic, as indicated in the log, of a processing instance in the second subset; and
scaling the first computing system based on the respective allocations for each of the plurality of resources.

2. A method for determining allocatable resources during proportional maintenance of complex computing systems using bifurcated filtering, the method comprising:
receiving a log of a plurality of processing instances for a first computing system;
determining a first subset of processing instances by filtering the plurality of processing instances based on whether each of the plurality of processing instances are linked to one or more identifiable resources;

determining a second subset of processing instances by filtering the first subset based on whether the one or more identifiable resources correspond to a resource available to be added to a resource pool, wherein the resource pool comprises a plurality of resources;

retrieving a proportional allocation setting for the first computing system;

determining respective allocations for each of the plurality of resources in the resource pool based on the proportional allocation setting; and scaling the first computing system based on the respective allocations for each of the plurality of resources.

3. The method of claim 2, wherein determining the respective allocations for each of the plurality of resources in the resource pool based on the proportional allocation setting further comprises:

determining, based on the log, respective processing characteristics for each of the plurality of processing instances; and further determining the respective allocations for each of the plurality of resources in the resource pool based on a respective processing characteristic, as indicated in the log, of a processing instance in the second subset.

4. The method of claim 2, wherein determining the second subset of processing instances by filtering the first subset further comprises:

determining respective processing characteristics, as indicated in the log, of processing instances in the first subset; and further filtering the first subset based on the respective processing characteristics.

5. The method of claim 2, wherein determining the second subset of processing instances by filtering the first subset further comprises:

determining the processing instances in the first subset linked to a single identifiable resource; and further filtering the first subset based on the processing instances in the first subset being linked to the single identifiable resource.

6. The method of claim 2, wherein receiving the log of the plurality of processing instances for the first computing system further comprises:

determining a frequency for determining the respective allocations for each of the plurality of resources in the resource pool; and generating a request for the log based on the frequency.

7. The method of claim 2, wherein determining the respective allocations for each of the plurality of resources in the resource pool further comprises:

generating for display, in a user interface, a recommendation corresponding to the respective allocations; and executing the respective allocations based on a user input confirming the recommendation.

8. The method of claim 2, wherein determining the respective allocations for each of the plurality of resources in the resource pool further comprises:

determining a resource pool attribute for the resource pool; and comparing the proportional allocation setting to the resource pool attribute.

9. The method of claim 2, wherein determining the respective allocations for each of the plurality of resources in the resource pool further comprises:

determining a respective processing characteristic, as indicated in the log, of a processing instance in the second subset; and comparing the proportional allocation setting to the respective processing characteristic.

10. The method of claim 2, further comprising:

determining a resource pool attribute based on the respective allocations; and comparing the resource pool attribute to a resource pool requirement to determine whether to execute the respective allocations.

11. The method of claim 2, further comprising:

determining current resource pool allocations;

determining a resource pool attribute based on the respective allocations and the current resource pool allocations; and comparing the resource pool attribute to a resource pool requirement to determine whether to execute the respective allocations.

12. The method of claim 2, wherein determining the first subset of processing instances by filtering the plurality of processing instances further comprises:

retrieving a processing characteristic from the log; and parsing the processing characteristic to identify a resource name.

13. The method of claim 2, wherein determining the first subset of processing instances by filtering the plurality of processing instances further comprises:

retrieving a device driver log; and comparing the device driver log to the log to identify a resource.

14. The method of claim 2, wherein determining the first subset of processing instances by filtering the plurality of processing instances further comprises:

retrieving a system call log; and comparing the system call log to the log to identify a resource.

15. The method of claim 2, wherein determining the first subset of processing instances by filtering the plurality of processing instances further comprises:

retrieving a system interrupt log; and comparing the system interrupt log to the log to identify a resource.

16. One or more non-transitory, computer-readable media, comprising instructions that, when executed by one or more processors, cause operations comprising:

receiving a log of a plurality of processing instances for a first computing system;

determining a first subset of processing instances by filtering the plurality of processing instances based on whether each of the plurality of processing instances are linked to one or more identifiable resources;

determining a second subset of processing instances by filtering the first subset based on whether the one or more identifiable resources correspond to a resource available to be added to a resource pool, wherein the resource pool comprises a plurality of resources;

retrieving a proportional allocation setting for the first computing system; and determining respective allocations for each of the plurality of resources in the resource pool based on the proportional allocation setting.

17. The one or more non-transitory, computer-readable media of claim 16, wherein determining the respective allocations for each of the plurality of resources in the resource pool based on the proportional allocation setting further comprises:

determining, based on the log, respective processing characteristics for each of the plurality of processing instances; and further determining the respective allocations for each of the plurality of resources in the resource pool based on a respective processing characteristic, as indicated in the log, of a processing instance in the second subset.

18. The one or more non-transitory, computer-readable media of claim 16, wherein determining the second subset of processing instances by filtering the first subset further comprises:
  determining respective processing characteristics, as indicated in the log, of processing instances in the first subset; and
  further filtering the first subset based on the respective processing characteristics.

19. The one or more non-transitory, computer-readable media of claim 16, wherein determining the second subset of processing instances by filtering the first subset further comprises:
  determining the processing instances in the first subset linked to a single identifiable resource; and
  further filtering the first subset based on the processing instances in the first subset being linked to the single identifiable resource.

20. The one or more non-transitory, computer-readable media of claim 16, wherein receiving the log of the plurality of processing instances for the first computing system further comprises:
  determining a frequency for determining the respective allocations for each of the plurality of resources in the resource pool; and
  generating a request for the log based on the frequency.

\* \* \* \* \*